United States Patent [19]
Takayama et al.

[11] Patent Number: 5,097,269
[45] Date of Patent: Mar. 17, 1992

[54] MULTISTATIC RADAR SYSTEMS

[75] Inventors: Naohisa Takayama; Takahiko Fujisaka; Yoshimasa Ohashi, all of Kanagawa, Japan

[73] Assignee: Mitsubishi DenkiKabushiki Kaisha, Tokyo, Japan

[21] Appl. No.: 647,167

[22] Filed: Jan. 24, 1991

Related U.S. Application Data

[63] Continuation of Ser. No. 399,153, Aug. 28, 1989, abandoned.

[30] Foreign Application Priority Data

Feb. 26, 1988 [JP] Japan .................................. 63-43607

[51] Int. Cl.$^5$ .............................................. G01S 3/02
[52] U.S. Cl. .................................................... 342/453
[58] Field of Search ................ 342/453, 387, 455, 456

[56] References Cited

U.S. PATENT DOCUMENTS 4,656,479  4/1987  Kirimoto et al. .
4,746,924  5/1988  Lightfoot ............................ 342/453
4,815,045  3/1989  Nakamura .

OTHER PUBLICATIONS

Caspers, R. W., "Bistatic and Multistatic Radar" in Skolnik, M. E., ed. Radar Handbook, Ch. 36, pp. 36-1 through 36-9, (McGraw-Hill).
Barton, D. K., *Radar System Analysis*, (Artech House, Inc., Dedham, Mass., 1975) pp. 263-273.
Sherman, S. M., *Monopulse Principles and Techniques*, (Artech House, Inc., Dedham, Mass., 1984), pp. xv-xviii and 1-21.
Ravin, A. E. et al., "Digital Multiple Beamforming Techniques for Radar", in *Proceedings EASCON '78*, pp. 152-163.
Brookner, E., ed., *Radar Technology*, (Artech House, Inc., Dedham, Mass., 1976), pp. 251-258.
Abramowitz, M. and Stegun, I. A., ed. *Handbook of Mathematical Functions: With Formulas, Graphs, and Mathematical Tables* (Dover Publications, New York) pp. 73, 79.
Caspers, "Bistatic and Multistatic Radar" in Skolnik, Radar Handbook, Ch. 36, pp. 36-1 to 36-19.
Barton, Radar System Analysis, Artech House, Inc. 1976, pp. 263-273.
Sherman, Monopulse Principles and Techniques, Artech House, Inc., 1984 pp. 15-18 and 1-21.
Ruvin, "Digital Multiple Beamforming Techniques for Radar", Proceedings EASCON '78, pp. 152-163.
Brookner, Radar Technology, Artech House, Inc., 1976, pp. 251-258.
Abramowitz et al., Handbook of Mathematical Functions: With Formulas, Graphs, and Mathematical Tables, Dover Publications, pp. 73, 79.

*Primary Examiner*—Theodore M. Blum
*Attorney, Agent, or Firm*—Wolf, Greenfield & Sacks

[57] ABSTRACT

A multistatic radar system is provided in which a transmitter radiating high-frequency radio waves is mounted on a flying object adapted to be launched into the sky, whereby the range of the radar system is improved.

10 Claims, 5 Drawing Sheets

MULTISTATIC RADAR SYSTEMS

This application is a continuation of application Ser. No. 07/399,153, filed Aug. 28, 1989, now abandoned.

BACKGROUND OF THE INVENTION

1. Field of the Invention

This invention relates to multistatic radar systems and is capable of increasing the observable range thereof.

2. Prior Art

Multistatic radar systems have hitherto been used in various configurations, such as those shown in FIGS. 1 and 2 of the drawings. Such configurations are shown, for example, in FIG. 6 of Chapter 36, "Bistatic and Multistatic Radar" of RADAR HANDBOOK, published by McGraw-Hill Inc.

The conventional radar system shown in FIG. 1 employs a transmitter means 1 for radiating high-frequency radio waves and receiver means 2, 3 for detecting a target 4. The conventional radar system shown in FIG. 2 also employs transmitter means 1, 5 and receiver means 2, 3, 6 in order to locate the target 4. In both the systems, the transmitter means 1, 5 and the receiver means 2, 3, 6 are placed on the ground.

The radar system of FIG. 1 is operated in such a manner that high-frequency radio waves radiated from the transmitter means 1 are directed to and reflected by the target 4, and the reflected waves are received by the receiver means 2 and 3 which locate and track the target 4 on the basis of the received waves. If the target 4 exists behind a mountain or below the horizon, however, the emitted radio waves would not reach the target 4 so making it impossible to search and track the target 4.

The radar system of FIG. 2 is also operated so that high-frequency radio waves radiated from both the transmitter means 1 and 5 are directed to and reflected by the target 4, and the reflected waves are received by the receiver means 2, 3 and 6 which locate and track the target 4 using the received waves. Again the radiated radio waves cannot reach the target 4, when the target is behind a mountain or below the horizon.

Such conventional multistatic radar systems as described above have drawbacks such that the target-searching and tracking ranges per one transmitter means are limited and it is required to place a number of transmitter means at different sites.

SUMMARY OF THE INVENTION

In view of the above-described problems inherent in the prior art, it is an object of the invention to provide a multistatic radar system which can increase the range of target-searching and tracking.

According to the present invention, there is provided a multistatic radar system wherein a transmitter means for radiating high-frequency radio waves is mounted on a satellite or flying object, and a receiver means including an antenna and receiver for receiving the radio waves is placed on the ground.

Since the transmitter means according to the present invention is mounted on the satellite or the like flying in the sky, the high-frequency radio waves emitted from such transmitter means are radiated in a larger range than that covered by radio waves emitted from a transmitter means placed on the ground.

BRIEF DESCRIPTION OF THE DRAWINGS

The present invention will now be described by way of a preferred embodiment with reference to the accompanying drawings in which.

DESCRIPTION OF THE PREFERRED EMBODIMENT

Figure 1:
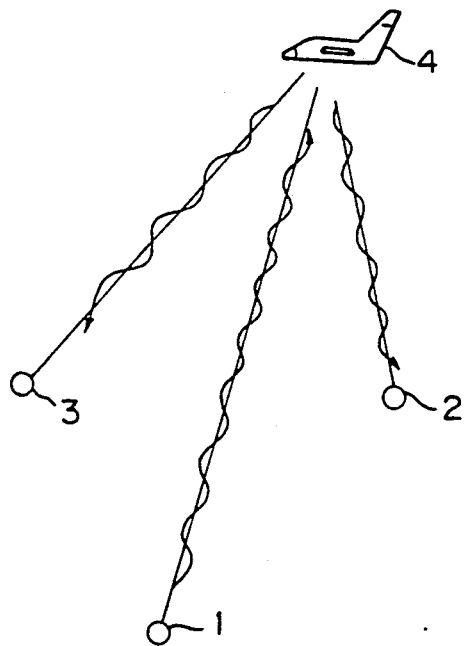
FIG. 1 shows a conventional multistatic radar configuration.
Figure 2:
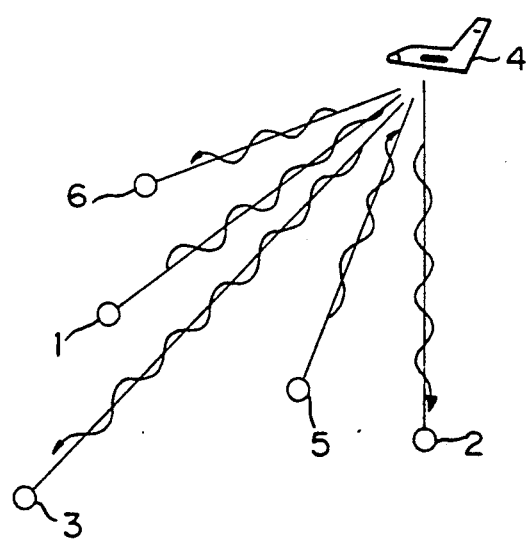
FIG. 2 shows another conventional multistatic radar configuration.
Figure 3:
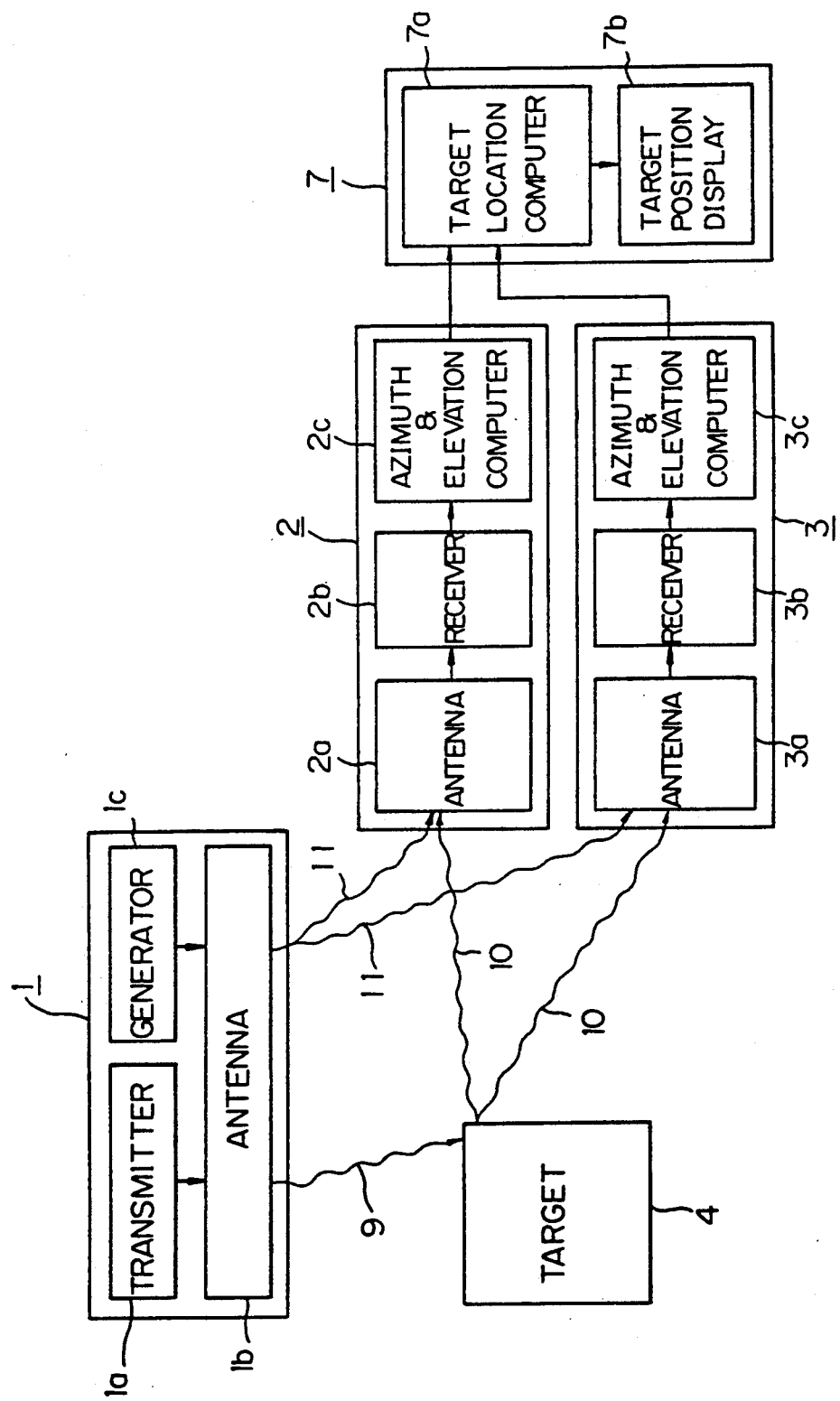
FIG. 3 is a block diagram of a preferred embodiment of the multistatic radar system in accordance with the present invention.

Referring to FIG. 3, there is shown a multistatic radar system comprising a transmitter means 1 including a transmitter 1a, a transmitting antenna 1b and a timing signal generator 1c, the transmitter means 1 being mounted on a satellite or flying object 8 (FIG. 4) launched into the sky. The system further comprises first and second receiver means 2 and 3, the first receiver means 2 including a receiving antenna 2a, a receiver 2b and a computer 2c for calculating azimuth and elevation angle, and the second receiver means 3 also including a receiving antenna 3a, a receiver 3b and a computer 3c for calculating the azimuth and elevation angle of the arrival direction of the received waves. The first and second receiver means 2 and 3 are both fixed on the ground at different sites. The system is so arranged that high-frequency radio waves 9 are radiated from the transmitting antenna 1b in a direction towards a target 4 and the reflected waves 10 from the target 4 are received through the receiving antennas 2a and 3a.

The first and second receiver means 2 and 3 are associated with a target-position displaying means 7 which includes a target-location computer 7a connected to the azimuth and elevation angle computers 2c and 3c. The target-location computer 7a is supplied with the outputs of the computers 2c and 3c to calculate the position of the target 4. The target-position displaying means 7 further includes a target-position displaying unit 7b which displays the position of the target 4 calculated by the computer 7a. The target-position displaying means 7 is also disposed on the ground at an appropriate site.

Figure 4:
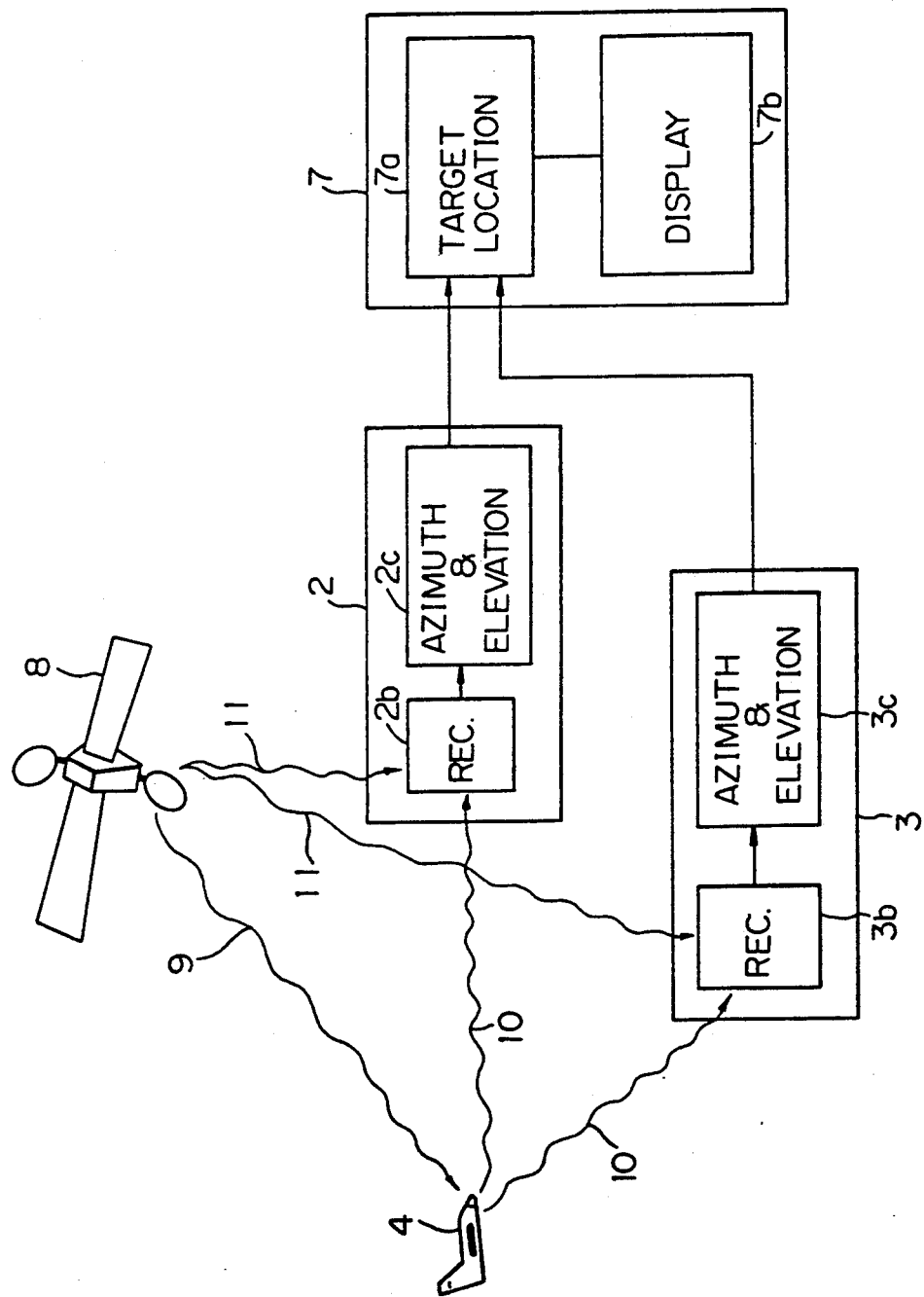
FIG. 4 is a diagram for explaining the operation of the system of FIG. 3.

With the arrangement described above, the multistatic radar system of FIG. 3 is so operated that, as shown in FIG. 4, a part 9 of the high-frequency radio waves transmitted through the transmitting antenna 1b from the transmitter 1a of the transmitter means 1 (FIG. 3) mounted on the satellite (or flying object) 8 flying in the sky is directed to and reflected by the target 4 and a part of the reflected waves 10 is directed to the first and second receiver means 2 and 3 on the ground. The timing signal generator 1c (FIG. 3) of the transmitter means 1 also produces a timing signal 11 for representing the transmission of the radio waves for searching and tracking the target 4, and the timing signal 11 is transmitted through the antenna 1b to the ground simultaneously with the transmission of the high-frequency radio waves 9.

The reflected waves 10 are received by the receivers 2b and 3b through the antennas 2a and 3a (FIG. 3) on the ground and used to calculate the azimuth and elevation angle in the computers 2c and 3c. These calculations are initiated at the time when the timing signal 11 is received by the receivers. This is advantageous in that the operation of the computers can be suspended while the searching and tracking operation is not required, thereby reducing the calculating load of the computers. The data calculated by the azimuth and elevation angle computers 2c and 3c are supplied to the target-location computer 7a to perform calculation 14 for obtaining the position of the target 4 on the basis of the distance between the receiver means 2 and 3 on the ground. The position of the target 4 thus obtained is displayed on the target-position displaying unit 7b.

Figure 5:
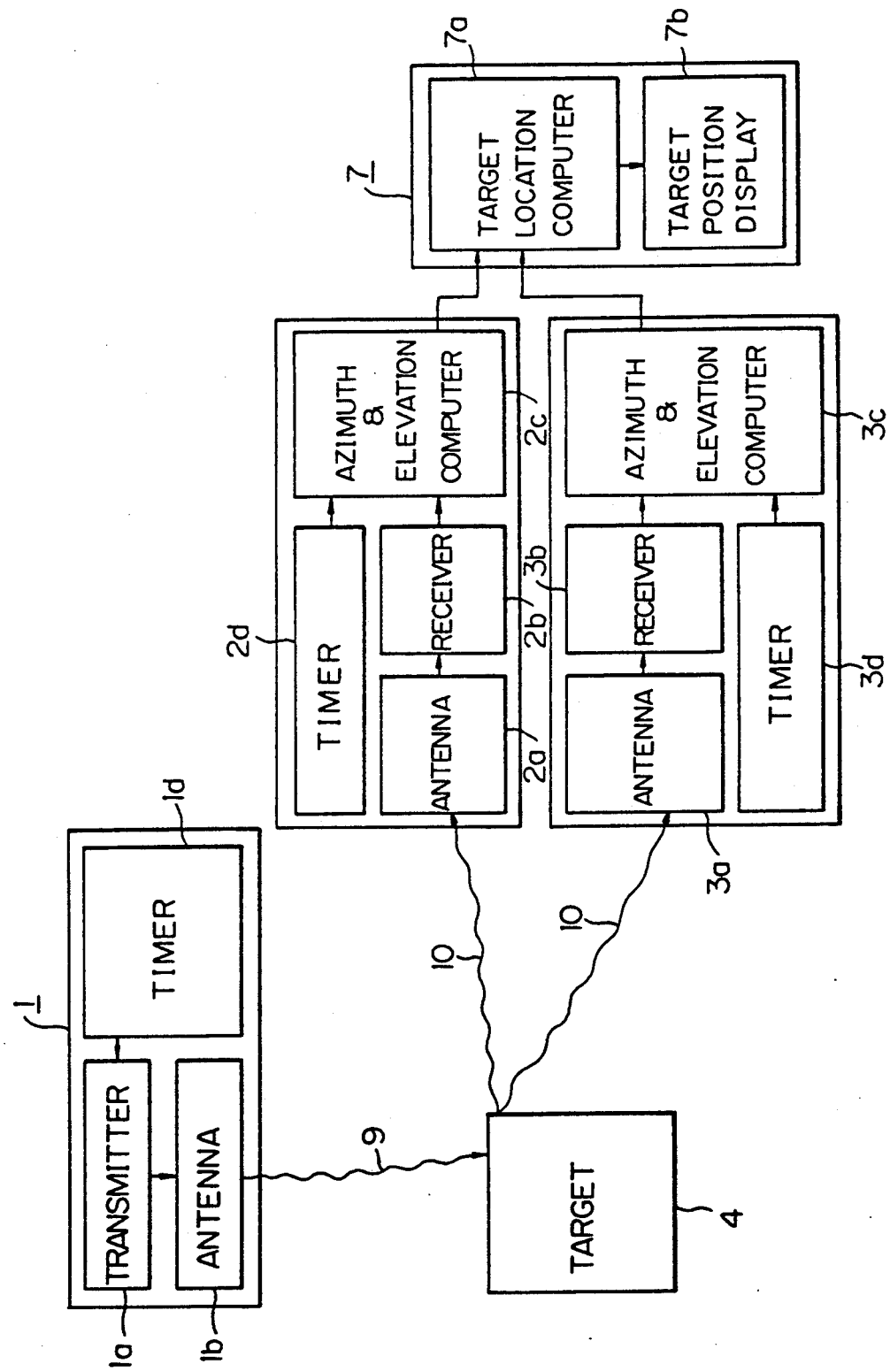
FIG. 5 is a block diagram of another embodiment of the system of the invention.

FIG. 5 diagrammatically shows another embodiment of the multistatic radar system according to the present invention in which a transmitter means 1 has a timer device 1d in addition to the transmitter 1a and the transmitting antenna 1b. The first and second receiver means 2 and 3 are also additionally provided with the timer devices 2d and 3d, respectively. The remaining portions of the system shown in FIG. 5 are substantially the same as those of the system shown in FIG. 3.

Figure 6:
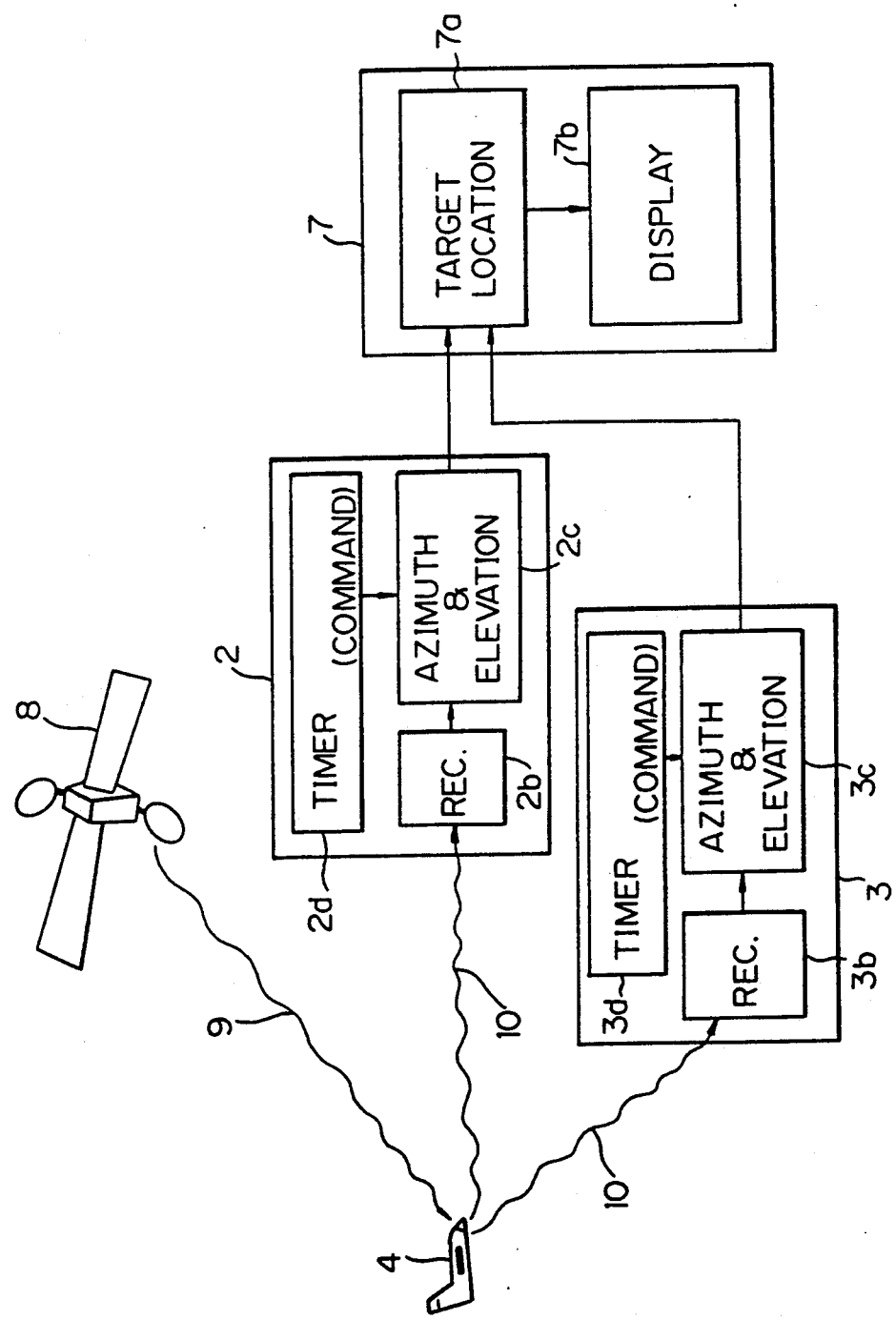
FIG. 6 is a diagram for explaining the operation of the system of FIG. 5.

The system of FIG. 5 is so operated that, as shown in FIG. 6, the transmitter means 1 is mounted on a satellite (or a flying object) 8 flying in the sky, and a command of transmission is fed from the timer device 1d to the transmitter 1a (FIG. 5) which then transmits, in response to the command, high-frequency radio waves 9 for searching and tracking the target 4. The transmission command from the timer device 1d is provided at a predetermined time. The timer devices 2d, 3d of the first and second receiver means 2, 3 are adapted to feed calculation command signals to the azimuth and elevation angle computers 2c, 3c at the same time as the generation of the transmission command from the timer device 1d of the transmitter means 1.

A part of the transmitted high-frequency radio waves 9 is struck upon and reflected by the target 4, and a part of the reflected waves 10 is also directed to the first and second receiver means 2 and 3 on the ground. Receiving of the reflected waves 10 is performed by the receivers 2b, 3b through the receiving antennas 2a, 3a (FIG. 5) and calculation of the azimuth and elevation angle of the target 4 is then performed in the computers 2c, 3c. This calculation is initiated only when the calculation commands are received from the timer devices 2d, 3d. This is advantageous in that the operation of the computers can be suspended while the searching and tracking operation is not required, thereby reducing the calculating load of the computers. The data calculated by the azimuth and elevation angle computers 2c, 3c are provided to the target-location computer 7a for performing calculation 4 to obtain the position of the target 4 on the basis of the distance between the first and second receiver means 2 and 3 on the ground, and the obtained position of the target 4 is displayed on the target-position displaying unit 7b.

Although a single transmitter means is shown in each of the embodiments described above, it is apparent for those skilled in the art that a plurality of transmitter means may be employed.

As described above, since the receiver means having transmitter and transmitting antenna for transmitting high-frequency radio waves is mounted on a satellite or flying object, the present invention is advantageous in that the transmitting waves are radiated in a broader range and the searching and tracking of the target can be achieved in a broader range in comparison with the conventional system having a transmitter means fixed on the ground.

This concludes the description of the embodiment of the invention. However, many modifications and alterations will be obvious to those skilled in the art without departing from the scope of the invention.

What is claimed is:

1. A multistatic radar system comprising:
    a transmitting means mounted on a satellite or a flying object, said transmitting means including a transmitter for transmitting high-frequency radio waves to perform the searching and tracking of a target, means for generating a timing signal simultaneously with the transmission of the high-frequency radio waves and a transmitting antenna for radiating the high-frequency radio waves and said timing signal from said transmitter; and
    a receiving means and means for disposing said receiving means on the ground, said receiving means including a receiving antenna for receiving said timing signal and said reflected waves from said target, a receiver for amplifying and modulating the radio waves arriving at said receiving antenna, determining means responsive to an output signal from said receiver and further responsive to said timing signal for producing a signal indicative of the arrival direction of the reflected waves from said target.

2. A multistatic radar system comprising;
    means for transmitting high-frequency radio waves, said transmitting means being mounted on a flying object adapted to be launched into the sky;
    means for generating a timing signal simultaneously with the transmission of high-frequency radio waves,
    a plurality of receiving means and means for disposing said receiving means on the ground, each of said receiving means including a receiver for receiving a portion of said high-frequency radio waves reflected by a target and a determining means operatively connected to the receiver, and responsive to said timing signal, for producing a data signal indicative of the azimuth and elevation angle of the target on the basis of the received radio waves; and
    calculating means responsive to the data signals from the plurality of determining means for calculating the position of the target on the basis of the one or more distances between said plurality of receiving means.

3. A multistatic radar system as recited in claim 2 further comprising means for displaying the position of the target calculated by said calculating means.

4. A multistatic radar system as recited in claim 1 wherein said determining means comprises an azimuth and elevation angle computer for calculating the azimuth and elevation angle of the arrival direction of the reflected waves from said target.

5. A multistatic radar system as recited in claim 2 wherein:
    each of said determining means comprises an azimuth and elevation angle calculating computer for calculating the azimuth and elevation angle of the arrival direction of the reflected waves from said target; and said calculating means comprises a target location computer responsive to the data signals from the plurality of determining means.

6. A multistatic radar system comprising:
a transmitting means mounted on a satellite or a flying object, said transmitting means including a transmitter for transmitting high-frequency radio waves to perform the searching and tracking of a target, means for generating and transmitting a timing signal simultaneously with said high-frequency radio waves and a transmitting antenna for radiating the high-frequency radio waves from said transmitter;
a plurality of receiving means and means for disposing said receiving means of the ground, each of said receiving means including a receiving antenna for receiving said timing signal and the reflected waves from said target, a receiver for amplifying and modulating the radio waves arriving at said receiving antenna, and determining means responsive to an output signal for said receiver and said timing signal for producing a data signal indicative of the arrival direction of the reflected waves from said target, each of said receiving means being separated from another of said receiving means by a respective distance; and
calculating means responsive to the data signals form the plurality of determining means for calculating the position of the target on the basis of the one or more distances between said plurality of receiving means.

7. A multistatic radar system as recited in claim 6, further comprising means for displaying the position of the target calculated by said calculating means.

8. A multistatic radar system as recited in claim 6 wherein:
each of said determining means comprises an azimuth and elevation angle calculating computer for calculating the azimuth and elevation angle of the arrival direction of the reflected waves from said target; and
said calculating means comprises a target location computer responsive to the data signals from the plurality of determining means.

9. A multistatic radar system comprising:
means for transmitting high-frequency radio waves, said transmitting means being mounted on a flying object adapted to be launched into the sky;
a plurality of receiving means and means for disposing said receiving means on the ground, each of said receiving means including a receiver for receiving a portion of said high-frequency radio waves reflected by a target and a determining means operatively connected to the receiver for producing a data signal indicative of the azimuth and elevation angle of the target on the basis of the received radio waves;
calculating means responsive to the data signals from the plurality of determining means for calculating the position of the target on the basis of the one or more distances between said plurality of receiving means; and
wherein said high-frequency radio waves transmitting means and each of said plurality of receiving means further comprises a timer means for generating an output signal at a predetermined time, wherein the transmission of high-frequency radio waves and the calculation of the azimuth and elevation angle of the target are simultaneously started in response to said output signal.

10. A multistatic radar system comprising:
a transmitting means mounted on a satellite or a flying object, said transmitting means including a transmitter for transmitting high-frequency radio waves to perform the searching and tracking of a target and transmitter means for generating and transmitting a timing signal simultaneously with said high-frequency radio waves and a transmitting antenna for radiating the high-frequency radio waves from said transmitter;
a plurality of receiving means and means for disposing said receiving means on the ground, each of said receiving means including a receiving antenna for receiving the reflected waves from said target, a receiver for amplifying and modulating the radio waves arriving at said receiving antenna, and determining means responsive to an output signal for said receiver and said timing signal for producing a data signal indicative of the arrival direction of the reflected waves from said target, each of said receiving means being separated from another of said receiving means by a respective distance;
calculating means responsive to the data signals from the plurality of determining means for calculating the position of the target on the basis of the one or more distances between said plurality of receiving means; and
wherein said high-frequency radio waves transmitting means and each of said plurality of receiving means further comprises a timer means for generating an output signal at a predetermined time, wherein the transmission of high-frequency radio waves and the calculation of the azimuth and elevation angle of the target are simultaneously started in response to said output signal.

* * * * *

UNITED STATES PATENT AND TRADEMARK OFFICE
CERTIFICATE OF CORRECTION

PATENT NO. : 5,097,269

DATED : March 17, 1992

INVENTOR(S) : Naohisa Takayama; Takahiko Fujisaka and Yoshimasa Ohashi

It is certified that error appears in the above-identified patent and that said Letters Patent is hereby corrected as shown below:

Title page, item (30):
Delete Foreign Application Priority Data "Feb. 26, 1988 (JP) Japan........ 63-43607".

Signed and Sealed this

Twenty-fourth Day of August, 1993

Attest:

BRUCE LEHMAN

*Attesting Officer*     *Commissioner of Patents and Trademarks*